United States Patent
Kondziela et al.

(10) Patent No.: US 12,048,908 B2
(45) Date of Patent: Jul. 30, 2024

(54) DYNAMIC MIXER HAVING BALANCEABLE FEEDING DUCTS

(71) Applicant: Kulzer GmbH, Hanau (DE)

(72) Inventors: Mike Kondziela, Weilburg (DE); Andreas Grundler, Muenzenberg (DE); Michael Hendrich, Bad-Homburg (DE)

(73) Assignee: Kulzer GmbH, Hanau (DE)

( * ) Notice: Subject to any disclaimer, the term of this patent is extended or adjusted under 35 U.S.C. 154(b) by 235 days.

(21) Appl. No.: 17/627,629

(22) PCT Filed: Jul. 10, 2020

(86) PCT No.: PCT/EP2020/069642
§ 371 (c)(1),
(2) Date: Jan. 14, 2022

(87) PCT Pub. No.: WO2021/009071
PCT Pub. Date: Jan. 21, 2021

(65) Prior Publication Data
US 2022/0258112 A1  Aug. 18, 2022

(30) Foreign Application Priority Data
Jul. 15, 2019 (DE) .......................... 102019119160.2

(51) Int. Cl.
*B01F 27/09* (2022.01)
*A61C 5/64* (2017.01)
(Continued)

(52) U.S. Cl.
CPC .............. *B01F 27/092* (2022.01); *A61C 5/64* (2017.02); *B01F 33/5014* (2022.01);
(Continued)

(58) Field of Classification Search
CPC ................ B01F 27/092; B01F 35/7174; B01F 2101/19; B01F 2101/2305; B01F 33/5014; B01F 35/7164; A61C 5/64
See application file for complete search history.

(56) References Cited

U.S. PATENT DOCUMENTS 4,432,469 A * 2/1984 Eble .................. B05C 17/00553
222/137
6,244,740 B1  6/2001 Wagner et al.
(Continued)

FOREIGN PATENT DOCUMENTS

DE            7934536 U1    10/1981
DE         298 18 499 U1     3/2000
(Continued)

*Primary Examiner* — Frederick C Nicolas
(74) *Attorney, Agent, or Firm* — Norris McLaughlin, P.A.

(57) ABSTRACT

Dynamic mixers and methods have a chamber part with a discharge opening, a mixing chamber, a closing part, first and second inlet openings, and a centrical opening. The chamber and closing parts mount against each other in a rotationally symmetric manner and the closing part has substantially parallel planes, wherein a first plane averts a rotor, a second plane faces the rotor, a first inlet opening and a passage opening form a linear duct, and the substantially parallel planes form a feeding duct. Dimensions of the feeding duct are variable depending on a relative rotationally symmetric position of the chamber and closing parts, wherein the dimensions include a length, a width and/or height, and a partial circle is formable by the feeding duct and may enclose an angle of 20-170 degrees depending on the relative rotationally symmetric position of the chamber and closing parts.

15 Claims, 4 Drawing Sheets

(51) Int. Cl.
  *B01F 33/501* (2022.01)
  *B01F 35/71* (2022.01)
  *B01F 101/00* (2022.01)
  *B01F 101/19* (2022.01)

(52) U.S. Cl.
  CPC ...... *B01F 35/7164* (2022.01); *B01F 35/7174* (2022.01); *B01F 2101/19* (2022.01); *B01F 2101/2305* (2022.01)

(56) References Cited

U.S. PATENT DOCUMENTS

| | | | |
|---|---|---|---|
| 6,394,643 B1* | 5/2002 | Bublewitz | A61C 5/64 366/326.1 |
| 6,523,992 B1* | 2/2003 | Bublewitz | A61C 9/0026 366/326.1 |
| 6,837,612 B2 | 1/2005 | Bublewitz et al. | |
| 2001/0005338 A1* | 6/2001 | Muhlbauer | B01F 33/5011 366/329.1 |
| 2004/0257909 A1* | 12/2004 | Pieroni | B05C 17/00516 222/145.6 |
| 2008/0264809 A1* | 10/2008 | Knispel | A61C 9/0026 206/219 |
| 2009/0034357 A1* | 2/2009 | Gramann | B01F 27/1125 366/77 |
| 2009/0207685 A1* | 8/2009 | Busin | B01F 33/822 366/15 |
| 2009/0296516 A1 | 12/2009 | Keller | |
| 2010/0208544 A1* | 8/2010 | Wintergerste | B05C 17/00566 366/134 |
| 2013/0077432 A1* | 3/2013 | Gramann | B01F 27/2712 366/150.1 |

FOREIGN PATENT DOCUMENTS

| | | |
|---|---|---|
| DE | 100 43 489 A1 | 3/2002 |
| DE | 101 64 385 C1 | 3/2003 |
| EP | 2 543 430 A1 | 1/2013 |
| WO | 2007/041878 A1 | 4/2007 |
| WO | 2009/033832 A1 | 3/2009 |
| WO | 2014/175673 A1 | 10/2014 |

* cited by examiner

DYNAMIC MIXER HAVING BALANCEABLE FEEDING DUCTS

CROSS-REFERENCE TO RELATED APPLICATIONS

This application is a 371 of International Patent Application No. PCT/EP2020/069642, filed Jul. 10, 2020, which claims priority of German Patent Application No. 10 2019 119 160.2, filed Jul. 15, 2019, the entire contents of which patent applications are hereby incorporated herein by reference.

FIELD OF THE DISCLOSURE

The present invention relates to a dynamic mixer, in particular for dental materials having different viscosity. Furthermore, the invention relates to a method for producing a dynamic mixer, in particular for dental materials of different viscosity.

BACKGROUND

Impression materials usually consist of two pasty masses. These two components are filled into cartridges and pressed out immediately before use and mixed at the same time. For large-volume 10:1 cartridges, so-called dynamic mixers are used. These mixers have two inlet openings that are connected to (plugged on) the discharge openings of the double cartridge. Subsequently, the assembly is inserted into a mixing device and the rotor of the dynamic mixer is connected to the drive shaft of the mixing device. The mixing device affects the homogeneity of the mixed impression material and thus directly the product quality via the extrusion pressure and the rotational speed.

It is stringently required for the mixer to work perfectly to feed the two components evenly until they meet at the rotor. The impression material becomes unusable if the mass flows of the two components fluctuate or one mass flow partially or completely breaks off.

To avoid this, a perfect balancing of the two feeding ducts, from inlet opening at the mixer to the rotor, is required. Usually, the outlet holes of the cartridges and the inlet openings of the mixers are designed for the two components in the same cross-sectional ratio as the later mixing ratio. The 10:1 cartridges and mixers currently in use at Kulzer have an area cross-section of approx. 12.2 mm$^2$ (catalyst) and 121 mm$^2$ (base). Thus, the ratio of the two cross-sections is 10:1. However, this design cannot take the different flow behaviour of different masses into account. The adjustment is made by introducing flow resistances into the inlet holes or into the flow path of the easier-flowing component, respectively. This balancing is carried out empirically and must be adjusted to the respective flow behaviour of the component individually. Adjustments to the mixer geometry require adjustments to the injection moulding tool. These steps are time-consuming and cost-intensive. Certain manufacturers therefore try to adjust the mixer geometry for a wider range of products.

This problem and possible solutions are described, e.g. in utility model document DE29818499U1 and in patent DE10164385C1. The larger mass flow from the larger cartridge is balanced here by means of a delay chamber and/or bypass channel. This solution approach causes a very high development effort. The rheological balancing is made in iterative steps with respective adjustments of the pilot tools. Thus, this solution has significant disadvantages in terms of development time and development costs. Since the balancing of the feeding ducts must be designed for the two pasty masses and their viscosity, the system cannot be used for other viscosities or pasty masses, respectively, or only to a limited extent.

SUMMARY OF THE DISCLOSURE

It is therefore an object of the present invention to provide a dynamic mixer which is not only designed for two pasty masses having two different viscosities, but for a multitude of pasty masses having a multitude of different viscosities. A dynamic mixer should be applicable for a multitude of different pasty masses, wherein it is ensured for each two of this multitude of different masses to feed the two components evenly until they meet at the rotor of the dynamic mixer.

The object of the present invention is solved by a dynamic mixer, in particular for dental materials having different viscosity, the dynamic mixer comprising:
  a chamber part being largely cylindrical at least in part, having a discharge opening at the front end of the chamber part, the chamber part comprising a mixing chamber, and
  a closing part arranged at the back end of the chamber part, having a first and second inlet opening for single components to be inserted, as well as a centrical opening for a mixer shaft of a rotor being rotatable about its longitudinal axis in the chamber part,
the chamber part and the closing part being mounted against each other in a rotationally symmetric manner to the mixer shaft, the closing part having at least two substantially parallel planes at the side averting the rotor tip that are axially put in a row, the plane averting the rotor comprising the first and the second inlet opening, the plane facing the rotor having a first and a second passage opening to the mixing chamber, the first inlet opening and the first passage opening forming a linear duct, the at least two substantially parallel planes axially put in a row forming a feeding duct between the second inlet opening and the second passage opening to the mixing chamber, the feeding duct extending on an inner partial circle of the closing part, characterised in that the dimensions of the feeding duct are variable depending on the relative rotationally symmetric position of chamber part and closing part, the dimensions of the feeding duct comprising a length, a width and/or height of the feeding duct. Preferably, the mixer is a dynamic mixer for dental materials or a dental dynamic mixer.

The feeding duct is a duct that preferably extends in an interspace between to planes, in particular between two planes being arranged substantially parallelly. In an embodiment, the feeding duct extends at the interface between chamber part and closing part und is variable in length, width and height by a rotation of chamber part and closing part relatively to each other, so that the path between the second inlet opening of the dynamic mixer and the second passage opening to the mixing chamber is variable in terms of length, width and height. One of a number of components can now be selected and the feeding duct can be adjusted in terms of length, width and height by rotating chamber part and closing part to each other until the selected component arrives at the rotor at the same time as a second selected component that uses the linear duct between the first inlet opening and the first passage opening. If another pair of components having other viscosities is chosen, it can once again be achieved for the two substances to reach the rotor at the same time by adjusting the length, width and height of the feeding duct by rotating chamber part and closing part relatively to each other. Each time the components are changed, the dimensions of the feeding duct, and thus the path between the second inlet opening of the dynamic mixer and the second passage opening to the mixing chamber, must be changed by rotating chamber part and closing part relatively to each other to make the respective two components arriving at the rotor at the same time. In doing so, the dynamic mixer is applicable for several different pairs of components having different viscosities.

The two substantially parallel planes axially put in a row may be two plane layers in the closing part that are adjacently arranged.

Viscosity denotes the viscidity or tenacity of liquids and gases (fluids). The higher the viscosity, the thicker (less flowable) the fluid; the lower the viscosity, the thinner (more flowable) it is.

If not further specified, the resistance of the fluid to shear is meant. It is therefore referred to a s shear viscosity, to distinguish it from elongational viscosity in case of elongation as well as bulk viscosity in case of uniform pressure.

Dental materials preferably comprise dental impression materials comprising two components (2K), particularly preferably 2K-polydimethyl siloxane (PDMS).

In an embodiment, it is provided for the partial circle formed by the feeding duct to enclose an angle of 20 to 170 degree depending on the relative rotationally symmetric position of chamber part and closing part.

Thus, the length of the feeding duct which is situated on a partial circle of the closing part is variable and can be expressed in angular degree as well as in radian measure. The thinner (flowable) the component that should flow through the feeding duct, the longer the feeding duct.

According to an embodiment, the cross section of the feeding duct de- or increases in the direction of the mixing chamber, the height and/or width of the feeding duct de- or increasing in the direction of the mixing chamber, the height and/or width of the feeding duct at the second passage opening to the mixing chamber depending on the relative rotationally symmetric position of chamber part and closing part.

As a result, the feeding duct according to the invention has, for example, an additional flow resistance that may become increasingly pronounced by a narrowing in the direction of the mixing chamber.

In an embodiment, it is provided for the height and/or width of the feeding duct at transition to the second inlet opening to depend on the relative rotationally symmetric position of chamber part and closing part.

Height and/or width of the feeding duct at transition to the second inlet opening are thus variable and depend on the relative rotationally symmetric position of chamber part and closing part. Depending on the respective viscosity of the component, the height and/or width of the feeding duct at transition to the second inlet opening may be adjusted by merely rotating chamber part and closing part against each other.

The design renovation of the dynamic mixer, in particular for dental material, refers to the feeding ducts, in particular for dental materials, between insertion holes and beginning of the mixing chamber or rotor, respectively. A duct (cross duct to the drill axis) is situated at the outlet of the insertion hole in the closing part on the way to the rotor. This duct is helically arranged and extends on the partial circle of the respective insertion holes in an angle of 20-170°. The height and/or width of the duct increases, so that the duct cross section enlarges and the flow resistance for the pastes flowing through changes and may thus be affected. By attaching closing part and chamber part in a rotated orientation, a different height of the duct at transition to the insertion hole results. This may be used to achieve optimal balancing between the two pasty masses.

According to an embodiment, the feeding duct, in particular for dental materials, has a spatially restricted partition wall on another inner partial circle or on an inner ellipsoidal path, the partition wall being part of the chamber part or part of the closing part, the partition wall separating the feeding duct from the missing chamber, the partition wall taking a different relative position to the feeding duct respectively depending on the relative rotationally symmetric position of chamber part and closing part.

The partition wall separates mixing chamber and feeding duct from each other. The partition wall is either part of the chamber part or part of the closing part and forms a variable inner wall of the feeding duct. The position of the partition wall relatively to the feeding duct depends on the relative rotation of chamber part and closing part. The partition wall should form a shorter part of the inner wall in case of a higher viscous component as in case of a lower viscous component. The partition wall thus represents a further parameter for adjusting a dynamic mixer to the viscosity of a component.

In an embodiment, it is provided for the chamber part or the closing part to have at least one trunnion, the at least one trunnion projecting with its longitudinal axis into the feeding duct.

In this way, a flow resistance is integrated into the feeding duct in an advantageous manner. The chamber part possesses at least one or two trunnions standing with the outer edge on the identical partial circle diameter (+ play) of the feeding ducts of the closing part. The trunnion protrudes into the feeding duct when mounting the closing part and the chamber part and forms a flow barrier for the pasty masses when flowing through it in later use. Since the trunnion is on the same partial circle as the feeding ducts and the outer design of the two housing is rotationally symmetric, the position of the two housing elements can be rotatorily rotated against each other (angle β in FIG. 10). Thus, the distance (radian measure) from the trunnion to the insertion hole changes. Additionally, the gap between trunnion and inner wall of the feeding duct widens by the increasing width/height of the feeding ducts. The flow resistance in the feeding duct would decrease due to the barrier effect of the trunnion when pasty masses flowing through it in an application. In doing so, the mass flow of the paste may be balanced such that both pastes arrives at the rotor at the same time. Thus, discard due to possible inhomogeneity during initial mixing can be reduced.

The at least one trunnion of the chamber part, standing with its outer edge on the identical partial circle diameter (+ play) of the feeding duct of the closing part, projects into the feeding duct. The feeding duct may have an adjustable cross-section (without trunnion). If the trunnion now projects into the feeding duct, the empty cross-section of the feeding duct that corresponds to the cross-section of the feeding duct minus the trunnion results. Thus, the at least one trunnion forms a flow barrier since the at least one trunnion reduces the flow in the feeding duct, in particular the empty cross-section results in the feeding duct (cross-section feeding duct−cross-section trunnion=empty cross-section feeding duct). The empty cross-section may be adjusted to the feeding duct by changing the position of the trunnion by changing the position of chamber part and closing part (both housing parts), in particular by rotating them against each other. The trunnion or the trunnions are arranged in the chamber part and project into the feeding duct. The feeding duct is getting smaller with increasing flow path. By positioning chamber part and closing part differently, also the trunnion/the trunnions, in particular the flow obstacle(s), in the feeding duct are positioned differently and may thus modify the empty cross-section, synonymously to the open duct cross-section, at this point. Preferably, the empty cross-section or the open duct cross-section, respectively, may be enlarged or diminished by up to plus/minus 100%, in particular the empty duct cross-section of the feeding duct with trunnions may be diminished by at least 1% to preferably 100% compared to the cross-section of the feeding duct (duct cross-section without trunnions). Preferably, the empty duct cross-section may be adjusted by the at least one trunnion from 0% to 100%, in particular from 5% to 90%, particularly preferably from 5% to 25%, by changing the position of the trunnion.

According to a particularly preferred embodiment, the empty cross-section of the feeding duct, resulting from the cross-section of the feeding duct without trunnions minus the cross-section of the at least one trunnion, is adjustable by the relative position of the at least one trunnion in the feeding duct, the position of the at least one trunnion depending on the relative rotationally symmetric position of chamber part and closing part.

According to an embodiment, the relative position of the at least one trunnion in the feeding duct depends on the relative rotationally symmetric position of chamber part and closing part.

The flow resistance is thus variable as well.

In an embodiment, it is provided for one of the relative rotationally symmetric positions possible of chamber part and closing part is selected depending on the viscosity of the dental materials and fixed by welding.

The concept does not provide for mixers that can be individually adjusted by the user to different pastes. Rather, the concept of relative rotation of chamber part and closure part to each other enables an adjustment to the respective viscosity of the pasty masses. Once the optimum position of trunnion and feeding duct has been found, the positioning of the two components to each other is fixed by welding. If a viscosity of the pasty masses should change or a new product having new viscosity should come along, the new optimum mixing quality could be reestablished with the existing unwelded components by means of a new displacement on the partial circle of the two components to each other. Ideally, this could be solved by adjusting the automatic assembly machine. Expensive and time-consuming adjustments and trials of the injection moulding tools would thus be avoided.

According to an embodiment, the linear duct, which directly leads into the mixing chamber without a circuitous route, is attached to the first inlet opening, the feeding duct, which leads into the mixing chamber by a circuitous route between the at least two substantially parallel planes of the closing part that are axially put in a row, being attached to the second inlet opening, the linear duct being adapted to transport a first volume flow, the feeding duct being adapted to transport a second volume flow, the second volume flow amounting between 100% and 10% of the first volume flow.

The respective connection duct between the insertion hole and the mixing chamber is designed in conjunction with the flow barrier in such a way that at least one of the at least two volume flows results in 100% to 10% of the volume flow without reduction.

The invention further relates to a method for producing a dynamic mixer, in particular for dental materials of different viscosity, wherein the method may comprise the following steps of:
a) providing a chamber part being largely cylindrical at least in part, having a discharge opening at the front end of the chamber part, the chamber part comprising a mixing chamber;
b) providing a closing part having a first and second inlet opening for single components to be inserted, as well as a centrical opening for a mixer shaft of a rotor being rotatable about its longitudinal axis in the chamber part, the closing part having at least two substantially parallel planes at the side averting the rotor tip that are axially put in a row, the plane averting the rotor comprising the first and second inlet opening, the plane facing the rotor having a first and a second passage opening to the mixing chamber, in particular for dental materials, the first inlet opening and the first passage opening, in particular each for dental materials, forming a linear duct;
c) arranging the closing part at the back end of the chamber part and introducing the rotor into the mixing chamber, in particular for dental materials;
d) rotating the closing part against the chamber part, the dimensions of a feeding duct between the second inlet opening and the second passage opening to the mixing chamber, which is formed by the at least two substantially parallel planes of the closing part at the side averting the rotor tip that are axially put in a row, changes depending on the relative rotationally symmetric position of chamber part and closing part, the dimensions of the feeding duct comprising a length, a width and/or a height of the feeding duct; and optionally
e) fixing the closing part with the chamber part in the relative position, in which the feeding duct has optimal dimensions to make the dental materials having different viscosity meeting at the first and second passage opening at the same time, in particular welding of the closing part with the chamber part in the relative position, in which the feeding duct having optimal dimensions to make the dental materials having different viscosity meeting at the first and second passage opening at the same time.

In an embodiment, it may be provided for the method to comprise the steps of:
f) filling the dynamic mixer with the dental materials having different viscosity at the first and second inlet opening;
g) operating the rotor;
h) observing the behaviour of the dental materials having the different viscosity at the first and second passage opening depending on a relative rotational position of closing part and chamber part;
i) selecting the relative rotational position of closing part and chamber part, so that the dental materials having the different viscosity meet at the first and second passage opening at the same time, in particular selection is carried out depending on the course of the filling process of the mixer to make the dental materials having the different viscosity meeting at the first and second passage opening at the same time.

According to an embodiment, a relative position of a partition wall to the feeding duct changes when rotating the closing part against the chamber part, the partition wall being part of the chamber part or part of the closing part, the partition wall separating the feeding duct from the mixing chamber, the partition wall extending on another inner partial circle or on an inner ellipsoid path of the feeding duct.

Depending on the length of the inner wall of the feeding duct which is formed by the partition wall, that long is the path in the feeding duct to the passage opening to the mixing chamber, in particular for dental materials. If the partition wall forms a relatively long inner wall of the feeding duct, the longer the path from the inlet opening of the feeding duct through the feeding duct up to the passage opening into the mixing chamber. If the partition wall forms a relatively short inner wall of the feeding duct, the shorter the path from the inlet opening through the feed channel up to the passage opening into the mixing chamber.

In an embodiment, it is provided for relative position of at least on trunnion which projects with its longitudinal axis into the feeding duct to change in relation to the feeding duct when rotating the closing part against the chamber part.

In doing so, the flow resistance in the feeding duct according to the invention changes in an advantageous manner.

According to an embodiment, steps f) to i) are run through iteratively.

The invention further relates to a use of a dynamic mixer for mixing dental materials having different viscosity.

Further details, features and advantages of the invention arise from the drawings, as well as from the following description of preferred embodiments based on the drawings. In doing so, the drawings merely illustrate exemplary embodiments of the invention, which do not limit the essential idea of the invention.

DETAILED DESCRIPTION OF THE DISCLOSURE

Figure 1A:
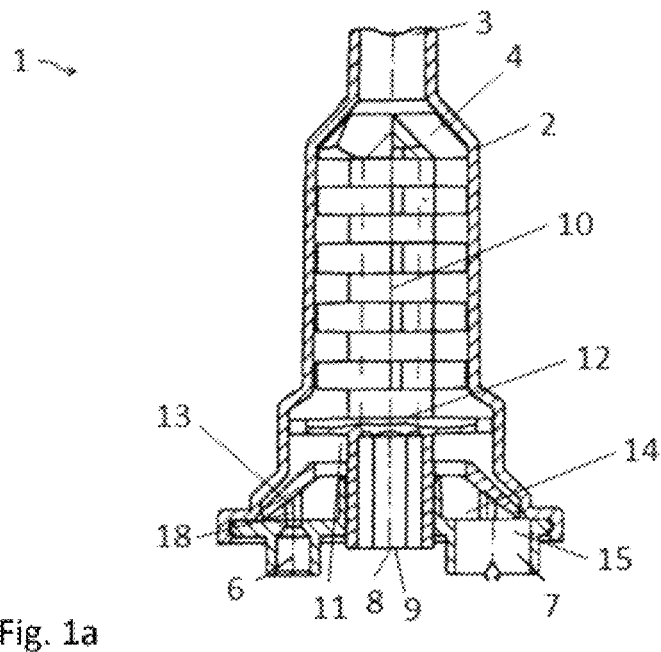
FIG. 1a and FIG. 1b show a dynamic mixer 1 in cross-section profile.
Figure 1B:
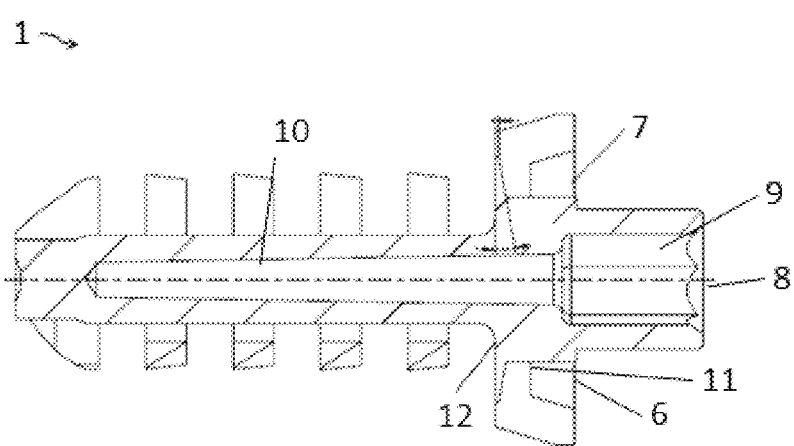

FIG. 1a and FIG. 1b show a dynamic mixer 1, in particular for dental materials, in cross-section profile. The mixer housing, in particular for dental materials, comprises a largely cylindrical chamber part 2 with internal mixing chamber 4 and a closing part 5 with a first and second inlet opening 6, 7 as well as a centrical opening 8 for a mixer shaft 9, located in the chamber part 2 and rotatably mounted about its longitudinal axis, of a rotor 10, which is centrally and rotationally symmetrically arranged in the mixing chamber 4.

Figure 2:
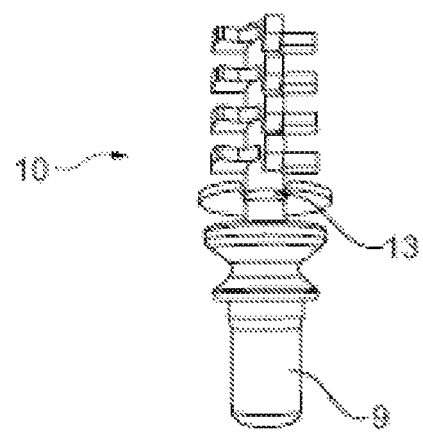
FIG. 2 shows a rotor 10 of a dynamic mixer 1.

FIG. 2 shows a rotor 10 of a dynamic mixer 1. The rotor 10 has rotor blades for the part intended for the mixing chamber 4, that are rotationally symmetrically arranged on the rotor. The rotor has two plateaus in the part indented for the closing part 5, wherein the plateau facing the rotor blades has a passage opening 13, 14 to the mixing chamber 4. The mixer shaft 9 is centrally mounted in the lower region of the rotor 10.

Figure 3:
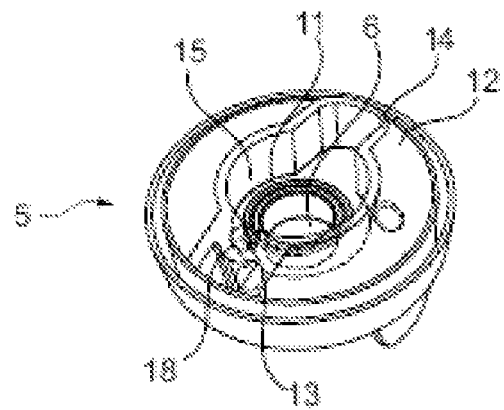
FIG. 3 shows a closing part 5 of the dynamic mixer 1.

FIG. 3 shows a closing part 5 of the dynamic mixer 1. The closing part 5 has at least two substantially parallel planes 11, 12 at the side averting the rotor tip, that are axially put in a row, wherein the plane 11 averting the rotor 10 comprises the first and second inlet opening 6, 7. The plane 12 facing the rotor 10 has a first and a second passage opening 13, 14 to the mixing chamber, wherein the first inlet opening 6 and the first passage opening 13 form a linear duct 18. The at least two substantially parallel planes 11, 12 axially put in a row form a feeding duct 15 between the second inlet opening 7 and the second passage opening 14 to the mixing chamber 4, wherein the feeding duct 15 extends on an inner partial circle of the closing part 5.

Figure 4:
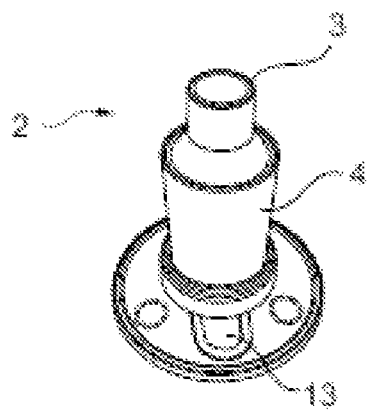
FIG. 4 shows a chamber part 2 of the dynamic mixer 1.

FIG. 4 shows a chamber part 2 of the dynamic mixer 1. The at least largely cylindrical chamber part 2 has a discharge opening 3 at the upper end of the chamber part 2. The chamber part comprises a mixing chamber 4. A passage opening 13, 14 to the mixing chamber 4 is shown in the lower part of the chamber part 2.

Figure 5:
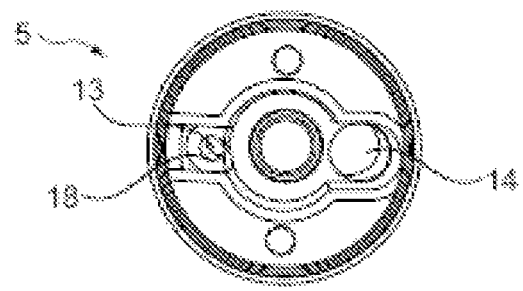
FIG. 5 shows a closing part 5 in interior view.

FIG. 5 shows a closing part 5 in interior view, quasi looking from the mixing chamber to the passage openings 13, 14. A first inlet opening 6 and the first passage opening 13 form a linear duct 18, which directly runs from outside into the mixing chamber 4.

Figure 6:
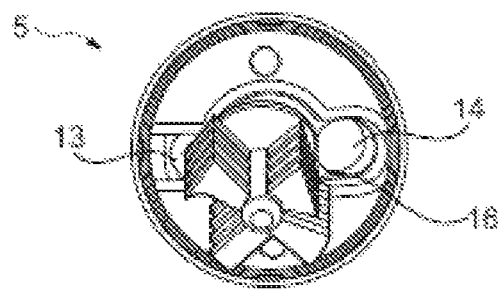
FIG. 6 shows a closing part 5 with inserted rotor 10.

FIG. 6 shows a closing part 5 with inserted rotor 10. The first passage opening 13 and the second passage opening 14 are shown on the side of the rotor 10.

Figure 7:
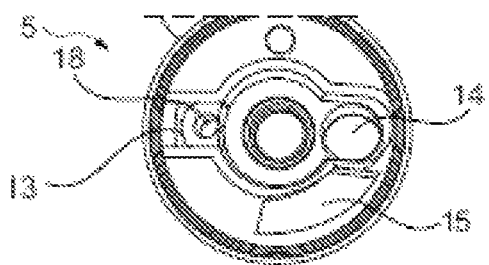
FIG. 7 shows a closing part 5 with marked feeding duct 15.

FIG. 7 shows a closing part 5 with marked feeding duct 15. The at least two substantially parallel planes 11, 12 axially put in a row form a feeding duct 15 between the second inlet opening 7 and the second passage opening 14 to the mixing chamber 4, wherein the feeding duct 15 extends on an inner partial circle of the closing par 5.

Figure 8:
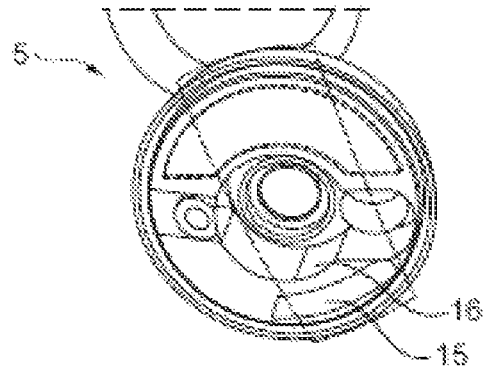
FIG. 8 shows a closing part 5 with marked feeding duct 15 and marked partition wall 16 between feeding duct 15 and mixing chamber 4.

FIG. 8 shows a closing part 5 with marked feeding duct 15 and marked partition wall 16 between feeding duct 15 and mixing chamber 4. the feeding duct 15 has a spatially restricted partition wall 16 on another inner partial circle or on an inner ellipsoidal path. The partition wall 16 may be part of the chamber part 2 or part of the closing part 5. In FIG. 8, the partition wall is part of the closing part 5. The partition wall separates the feeding duct 15 from the mixing chamber 4. The partition wall 16 respectively takes a different relative position the feeding duct 15 depending from the relative rotationally symmetric position of chamber part 2 and closing part 5.

Figure 9:
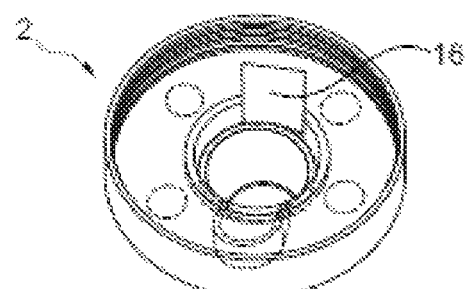
FIG. 9 shows a chamber part 2 with a marked partition wall 16 for the feeding duct 15.

FIG. 9 shows a chamber part 2 with a marked partition wall 16 for the feeding duct 15. The partition wall is part of the chamber part 2.

Figure 10:
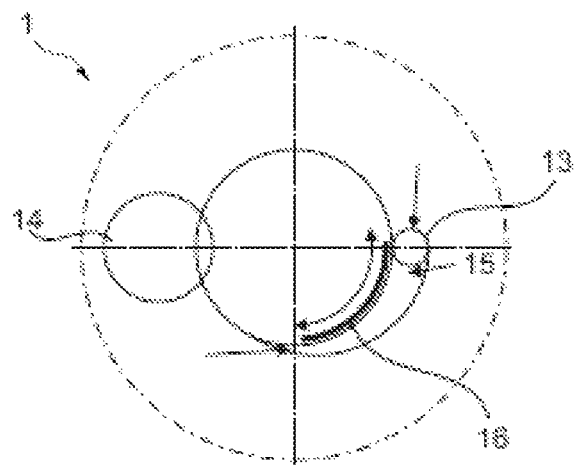
FIG. 10 shows a cross-section through the dynamic mixer 2 with feeding duct 15 according to the invention and partition wall 16.

FIG. 10 shows a cross-section through the dynamic mixer 1 with feeding duct 15 according to the invention and partition wall 16. When chamber part 2 and closing part 5 being rotated against each other, the partition wall 16 is displaced as well. This affects the length of the flow path and thus the flow resistance of the feeding duct 15. The feeding duct 15 may be balanced, so that the discharge quantity corresponds to the later mixing ratio.

Figure 11:
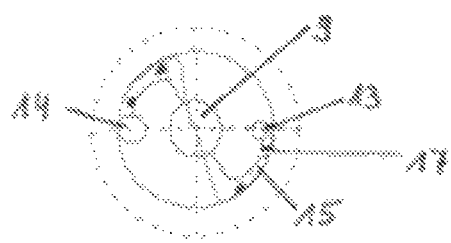
FIG. 11 shows a minimum and a maximum rotation of chamber part 2 and closing part 5 to each other.

FIG. 11 shows a minimum and a maximum rotation of chamber part 2 and closing part 5 against each other. Flow obstacles (trunnions 17 shown as circles) reduce the flow in the feeding duct. These trunnions 17 are arranged at the chamber part 2 and protrude in the feeding duct 15 with the closing part 5 after assembly. The feeding duct 15 is getting smaller with increasing flow path. By positioning chamber part 2 and closing part 5 differently, the flow obstacles in the feeding duct 15 are positioned differently and may thus modify the open duct cross-section at this point. This may also be used to balance the flow duct.

LIST OF REFERENCE NUMERALS 1 dynamic mixer
2 chamber part (=housing of the mixer lid)
3 discharge opening
4 mixing chamber
5 closing part (=housing of the mixer bottom)
6 first inlet opening
7 second inlet opening
8 centrical opening
9 mixer shaft
10 rotor
11 plane averting the rotor
12 plane facing the rotor
13 first passage opening
14 second passage opening
15 feeding duct
16 partition wall
17 trunnion
18 linear duct

The invention claimed is:

1. Dynamic mixer (1) comprising:
   a chamber part (2) being largely cylindrical at least in part, having a discharge opening (3) at a front end of the chamber part (2), the chamber part (2) comprising a mixing chamber (4), and
   a closing part (5) arranged at a back end of the chamber part (2), having a first and second inlet openings (6, 7) for single components to be inserted, and a centrical opening (8) for a mixer shaft (9) of a rotor (10) being rotatable about a longitudinal axis in the chamber part (2),
the chamber part (2) and the closing part (5) being mounted against each other in a rotationally symmetric position to the mixer shaft (9), the closing part (5) having at least two parallel planes (11, 12) at a side averting a rotor tip that are axially put in a row, the plane (11) averting the rotor (10) comprising the first and the second inlet openings (6, 7), the plane (12) facing the rotor (10) having a first and a second passage openings (13, 14) to the mixing chamber (4), the first inlet opening (6) and the first passage opening (13) forming a linear duct (18), the at least two parallel planes (11, 12) axially put in a row forming a feeding duct (15) between the second inlet opening (7) and the second passage opening (14) to the mixing chamber, the feeding duct (15) extending on an inner partial circle of the closing part (5), wherein dimensions of the feeding duct (15) are variable depending on a relative rotationally symmetric position of the chamber part (2) and the closing part (5), the dimensions of the feeding duct (15) comprising at least one of a length, a width and a height of the feeding duct (15), wherein the inner partial circle formed by the feeding duct (15) encloses an angle of 20 to 170 degree depending on the relative rotationally symmetric position of the chamber part (2) and the closing part (5).

2. Dynamic mixer (1) according to claim 1, wherein a cross section of the feeding duct (15) decreases or increases in the direction of the mixing chamber (4), the at least one of the length, the height and the width of the feeding duct (15) decreasing or increasing in the direction of the mixing chamber (4), the at least one of the length, the height and the width of the feeding duct at the second passage opening (14) to the mixing chamber (4) depending on the relative rotationally symmetric position of the chamber part (2) and the closing part (5).

3. Dynamic mixer (1) according to claim 1, wherein the at least one of the length, the height, and the width of the feeding duct (15) at transition to the second inlet opening depends on the relative rotationally symmetric position of the chamber part (2) and the closing part (5).

4. Dynamic mixer (1) according to claim 1, wherein the feeding duct (15) has a spatially restricted partition wall (16) on another inner partial circle or on an inner ellipsoidal path, the partition wall (16) being part of the chamber part (2), the partition wall separating the feeding duct (15) from the mixing chamber (4), the partition wall (16) taking a different relative position to the feeding duct (15) respectively depending on the relative rotationally symmetric position of the chamber part (2) and the closing part (5).

5. Dynamic mixer (1) according to claim 1, wherein the chamber part (2) has at least one trunnion (17), the at least one trunnion (17) projecting with a longitudinal axis into the feeding duct (15).

6. Dynamic mixer (1) according to claim 5, wherein a relative position of the at least one trunnion (17) in the feeding duct (15) depends on the relative rotationally symmetric position of the chamber part (2) and the closing part (5).

7. Dynamic mixer (1) according to claim 1, wherein one or more feasible relative rotationally symmetric positions of the chamber part (2) and the closing part (5) is selected depending on a viscosity of dental materials and fixed by welding.

8. Dynamic mixer according to claim 1, wherein the linear duct (18), which directly leads into the mixing chamber (4) without a circuitous route, is attached to the first inlet opening (6), the feeding duct (15), which leads into the mixing chamber (4) by a circuitous route between the at least two parallel planes (11, 12) of the closing part (5) that are axially put in a row, being attached to the second inlet opening (7), the linear duct (18) being adapted to transport a first volume flow, the feeding duct (15) being adapted to transport a second volume flow, the second volume flow amounting between 100% and 10% of the first volume flow.

9. Method of using the dynamic mixer (1) for mixing dental materials having different viscosities according to claim 1.

10. Method for producing a dynamic mixer (1) for pasty masses, wherein the method comprises the steps of:
   a) providing a chamber part (2) being largely cylindrical at least in part, having a discharge opening (3) at a front end of the chamber part (2), the chamber part (2) comprising a mixing chamber (4),
   b) providing a closing part (5) having a first and second inlet openings (6, 7) for single components to be inserted, as well as a centrical opening (8) for a mixer shaft (9) of a rotor (10) being rotatable about a longitudinal axis in the chamber part (2), the closing part (5) having a first parallel plane (11) and a second parallel plane (12) at a side averting a rotor tip that are axially put in a row, the first parallel plane (11) averting the rotor (10) comprising the first and second inlet openings (6, 7), the second parallel plane (12) facing the rotor (10) having a first and a second passage opening (13, 14) to the mixing chamber (4), the first inlet openings (6) and the first passage opening (13) forming a linear duct (18);
c) arranging the closing part (5) at a back end of the chamber part (2) and introducing the rotor (10) into the mixing chamber (4);
d) rotating the closing part (5) against the chamber part (2), dimensions of a feeding duct (15) between the second inlet opening (7) and the second passage opening (14) to the mixing chamber (4), which is formed by the first parallel plane (11) and the second parallel plane (12) of the closing part (5) at the side averting the rotor tip that are axially put in a row, changes depending on a relative rotationally symmetric position of the chamber part (2) and the closing part (5), the dimensions of the feeding duct (15) comprising at least one of a length, a width and a height of the feeding duct (15); and
e) fixing the closing part (15) with the chamber part (2) in the relative position, in which the feeding duct (15) has optimal dimensions to make the pasty masses having different viscosity meeting at the first and second passage openings (13, 14) at the same time.

11. Method according to claim 10, wherein the method comprises the steps of:
f) filling the dynamic mixer (1) with the pasty masses having different viscosity at the first and second inlet openings (6, 7);
g) operating the rotor (10);
h) observing a behaviour of the pasty masses having the different viscosity at the first and second passage openings (13, 14) depending on a relative rotational position of the closing part (5) and the chamber part (2);
i) selecting the relative rotational position of the closing part (5) and the chamber part (2) so that the pasty masses having the different viscosity meet at the first and second passage openings (13, 14) at the same time.

12. Method according to claim 10, wherein a relative position of a partition wall (16) to the feeding duct (15) changes when rotating the closing part (5) against the chamber part (2), the partition wall (16) being part of the chamber part (2), the partition wall (16) separating the feeding duct (15) from the mixing chamber (4), the partition wall (16) extending on an inner partial circle or on an inner ellipsoid path of the feeding duct (15).

13. Method according to claim 10, wherein a relative position of at least one trunnion (17) which projects with a longitudinal axis into the feeding duct (15) changes in relation to the feeding duct (15) when rotating the closing part (5) against the chamber part (2).

14. Method according to claim 11, steps f) to i) being run through iteratively.

15. Method according to claim 10, further comprising welding the closing part (5) and the chamber part (2) in the relative rotationally symmetric position, wherein the feeding duct (15) comprises optimal dimensions such that the pasty masses meet at the first passage opening (13) and the second passage opening (14) at the same time.

\* \* \* \* \*